United States Patent
Jordan, Jr.

(10) Patent No.: US 7,447,743 B1
(45) Date of Patent: Nov. 4, 2008

(54) METHODS AND SYSTEMS FOR ATTACHMENT PROCESSING IN ASSOCIATION WITH ELECTRONIC MESSAGES

(75) Inventor: Royce D. Jordan, Jr., Lawrenceville, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 586 days.

(21) Appl. No.: 09/943,836

(22) Filed: Aug. 31, 2001

(51) Int. Cl.
*G06F 15/16* (2006.01)

(52) U.S. Cl. .................................... 709/206; 709/207

(58) Field of Classification Search ......... 709/204–207, 709/238
See application file for complete search history.

(56) References Cited

U.S. PATENT DOCUMENTS

| | | | |
|---|---|---|---|
| 5,559,800 A | | 9/1996 | Mousseau et al. |
| 5,781,901 A | * | 7/1998 | Kuzma ........................ 707/10 |
| 6,092,114 A | * | 7/2000 | Shaffer et al. ............... 709/232 |
| 6,101,531 A | * | 8/2000 | Eggleston et al. ........... 709/206 |
| 6,219,694 B1 | | 4/2001 | Lazaridis et al. |
| 6,256,666 B1 | * | 7/2001 | Singhal ...................... 709/217 |
| 6,275,850 B1 | * | 8/2001 | Beyda et al. ................ 709/206 |
| 6,311,210 B1 | * | 10/2001 | Foladare et al. ............. 709/206 |
| 6,438,585 B2 | * | 8/2002 | Mousseau et al. .......... 709/206 |
| 6,701,378 B1 | * | 3/2004 | Gilhuly et al. .............. 709/249 |
| 6,779,019 B1 | * | 8/2004 | Mousseau et al. .......... 709/206 |
| 6,981,023 B1 | * | 12/2005 | Hamilton et al. ........... 709/206 |
| 2002/0016818 A1 | * | 2/2002 | Kirani et al. ................ 709/203 |
| 2002/0104026 A1 | * | 8/2002 | Barra et al. ................. 713/202 |
| 2003/0093565 A1 | * | 5/2003 | Berger et al. ............... 709/246 |

OTHER PUBLICATIONS

"BlackBerry Wireless Email Enhancements," printed from http://www.mi8.com/static/product_detail/BlackBerryAddon.asp on Feb. 20, 2002.

(Continued)

*Primary Examiner*—John Follansbee
*Assistant Examiner*—Aaron Strange
(74) *Attorney, Agent, or Firm*—Thomas, Kayden, Horstemeyer & Risley, LLP

(57) ABSTRACT

The present invention discloses methods and systems for processing data in a wireless communication network. A method embodiment includes receiving at least one electronic message having at least one attachment associated therewith; associating identifying indicia with the message according to the message characteristics; and using the identifying indicia to determine which portion of the message should be delivered to a recipient of the message. The method can also include transmitting a portion of the message, such as its text without any applicable attachments, to a wireless application of the recipient. The method may include stripping data such as an attachment from the message before sending the message to the user. In one aspect of the method, the user can determine that further processing of at least one of the stripped attachments is needed. This further processing is accomplished by one or more of a plurality of subsystems. A system embodiment includes a gateway structured with an internal network to receive electronic messages from either the Internet or a wireless data network. The gateway is structured to identify each electronic message with an indicia tag representative of at least one characteristic of the message. The gateway is also structured to transmit, or not transmit, at least a portion of the message to a recipient according to the information contained in the indicia tag. Computer-readable media embodiments of the present methods and systems are also disclosed.

21 Claims, 6 Drawing Sheets

OTHER PUBLICATIONS

"NeedText Attachment Opener," printed from http://www.needtext.net/attachment/index.xml on Feb. 20, 2002.

"Itrezzo Integrated Messaging," printed from http://www.itrezzo.com/services.htm on Feb. 20, 2002.

"Itrezzo Licenses Arizan Technology To Extend Features for Wireless Users," printed from http://www.itrezzo.com/Press_Releases/rim_blackberry_press_011602.htm on Feb. 20, 2002.

"Using My Docs Online with a RIM BlackBerry™ Pager," printed from http://www.mydocsonline.com/info_using_blackberry.html on Feb. 20, 2002.

"AirDoc Platform™," printed from http://www.arizan.com/solutions/solutions_airdoc_platform.html on Feb. 20, 2002.

"METAmessage for Wireless," printed from http://www.onsettechnology.com/pr2_mm.htm on Feb. 20, 2002.

"Onset Announces Email Attachment and Fax Solutions," printed from http://www.intranetjournal.com/articles/200102/na_02_21_01d.html on Feb. 20, 2002.

\* cited by examiner

METHODS AND SYSTEMS FOR ATTACHMENT PROCESSING IN ASSOCIATION WITH ELECTRONIC MESSAGES

BACKGROUND OF THE INVENTION

1. Field of the Invention

The present invention generally relates to methods and systems for wireless communication. The present invention more particularly relates to methods and systems for processing data through wireless communication media.

2. Description of the Related Art

Due to bandwidth limitations associated with wireless communications, it is desirable to minimize the size and volume of data traffic that flows through a wireless network. Electronic messages are typically transmitted between and among components in a wireless network. Electronic messages having associated attachments, however, can place stress on a wireless communication network by requiring and consuming excessive portions of wireless bandwidth.

In a wireless network, an attachment associated with an electronic message is often too large (e.g., too many bytes in size) in view of bandwidth available for transmission of the attachment to permit effective delivery of the attachment to a recipient. Such attachments may be in the nature of, for example, spreadsheets, word processing documents, drawing or picture files, presentation slides, or other documents of a size that is not amenable to wireless communication.

Unfortunately, the recipient of an electronic message is typically not notified when transmission of such an attachment is unsuccessfully attempted by a sender. In addition, any text in the body of the electronic message associated with the attachment (e.g. the text of an e-mail message) may not be seen by the recipient, because the size of the attachment may have caused the entire electronic message to be denied transmission to the recipient. In summary, if a sender forwards an electronic message with an attachment through a wireless network, the wireless application will not strip the attachment from the message and send the text of the message. Typically, the electronic message is rejected in a manner that does not permit a recipient to see any text commentary that may have accompanied the attachment during transmission.

What are needed, therefore, are methods and systems for processing attachments associated with electronic messages that permit a recipient to manage such attachments more effectively. What are also needed are methods and systems that permit a recipient to receive and process at least a portion of an electronic message in the event that delivery of an attachment is limited by available wireless bandwidth. Such improved methods and systems should promote recipient access to at least a text portion of an electronic message even when transmission of an attachment associated with the electronic message is not possible or permitted by the wireless network.

What is lacking in the art is a gateway for wireless communication that can leverage active redundant components to achieve reliability and allow for growth and support of wireless communications, especially during unusually high volume periods of electronic message transmission. A gateway is also needed that can act substantially independently of the numerous wireless applications that can be employed by the recipient of an electronic message with an attachment. This independence would alleviate the need to obtain direct access to modify application source code to address attachment processing needs.

SUMMARY OF THE INVENTION

The present invention discloses methods and systems for processing data in a wireless communication network.

A method embodiment includes receiving at least one electronic message having at least one associated attachment; associating identifying indicia with the message according to the message characteristics; and using the identifying indicia to determine which portion of the message should be delivered to a recipient of the message. The method can also include transmitting a portion of the message, such as its text without any applicable attachments, to a wireless application of the recipient. This transmitted portion may include clear text and/or other data. The method may include stripping data, such as an attachment, from the message before sending the message to the user. In one aspect of the method, the user can determine that further processing of at least one of the stripped attachments is needed. This further processing can be accomplished by one or more of a plurality of subsystems.

A system embodiment of the present wireless communication network includes a system for processing an electronic message having at least one associated attachment. The system includes a gateway structured with an internal network to receive electronic messages from either the Internet or a wireless data network. The gateway is also structured to identify each electronic message with an indicia tag representative of at least one characteristic of the message. The gateway is further structured to transmit, or not to transmit, at least a portion of the message to a recipient according to the information contained in the indicia tag.

Computer-readable media embodiments of the present methods and systems are also discussed herein.

DETAILED DESCRIPTION

A "wireless application" as used herein is any application that includes hardware, firmware, software and/or some reasonable combination thereof, which can be employed in connection with wireless communication. Examples of wireless applications include, but are not limited to, pagers, personal digital assistants (PDA's), wireless telephones, wireless computers, digital cameras, and digital cameras including self-contained web-cams.

A "wireless data network" as employed herein can include any network of devices, systems, processes, data structures, hardware, software or other combination thereof that is structured to permit wireless communications between and/or among components or elements of the wireless data network. An example of one such wireless data network structured and suitable for use in accordance with the methods and systems discussed herein is a wireless data network marketed and sold in connection with the MOBITEX trade designation of Ericsson.

An "attachment" as used herein includes any data or data structure that is capable of association with an electronic message. Examples of attachments include, but are not limited to, word processing files, spreadsheet files, presentation files, database files, graphic files, web pages, and hypertext links.

The term "clear" as applied herein can be used in the context of data such as text, graphics and any other information to indicate data which is substantially not dependent on choice of a particular protocol (e.g. HTTP) for storage, transmission, display, and/or other electronic processing of the data.

As used herein, the terms "computer" and "computer system" include, but are not limited to, desktop computer systems, laptop computer systems, networked computer systems, wireless computer systems, and/or any combination of such systems.

The term "computer-readable medium" is defined herein as understood by those skilled in the art. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

Figure 1:
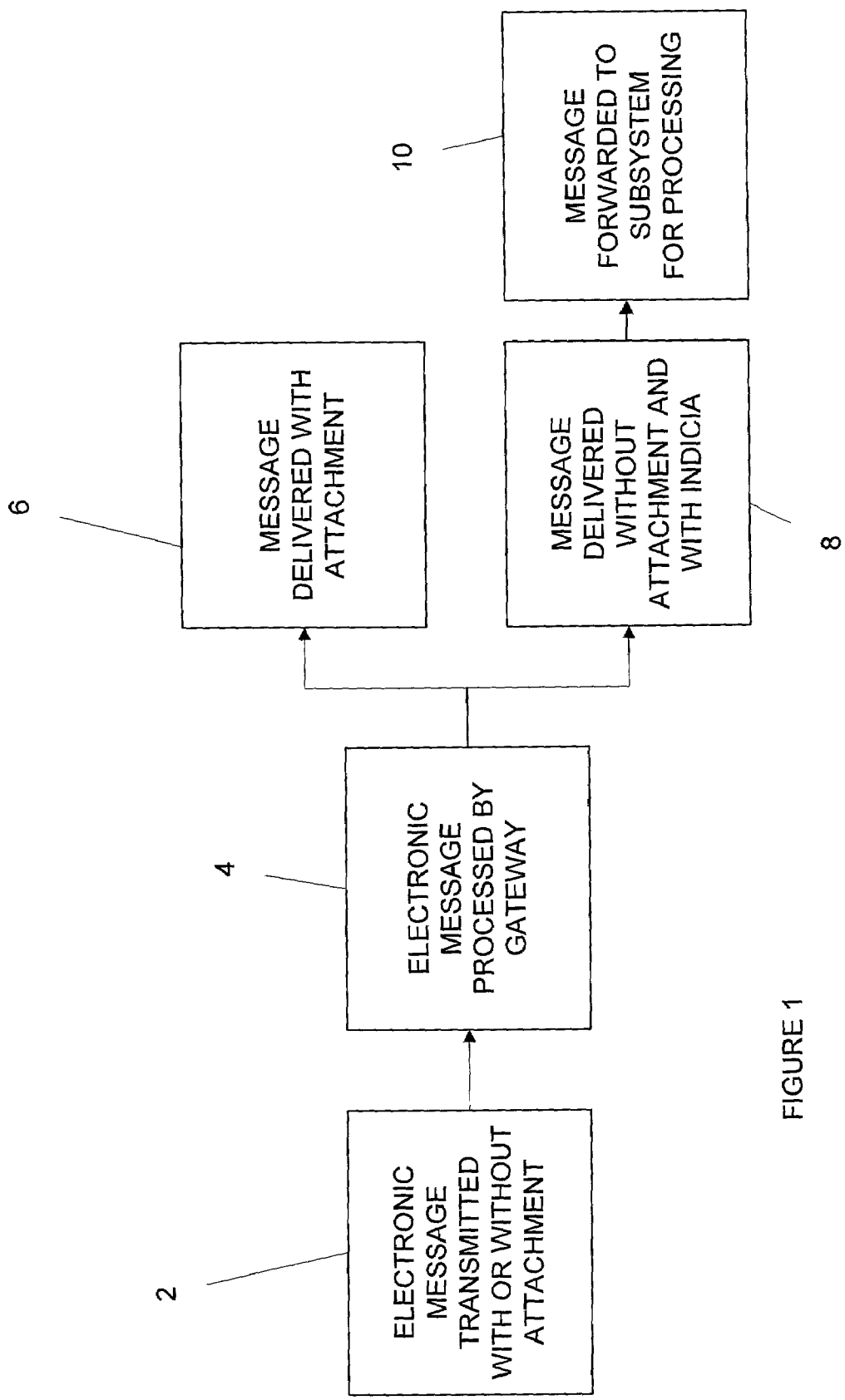
FIG. 1 is a process flow diagram showing an overview of an embodiment of a method for processing an electronic message.
Figure 2:
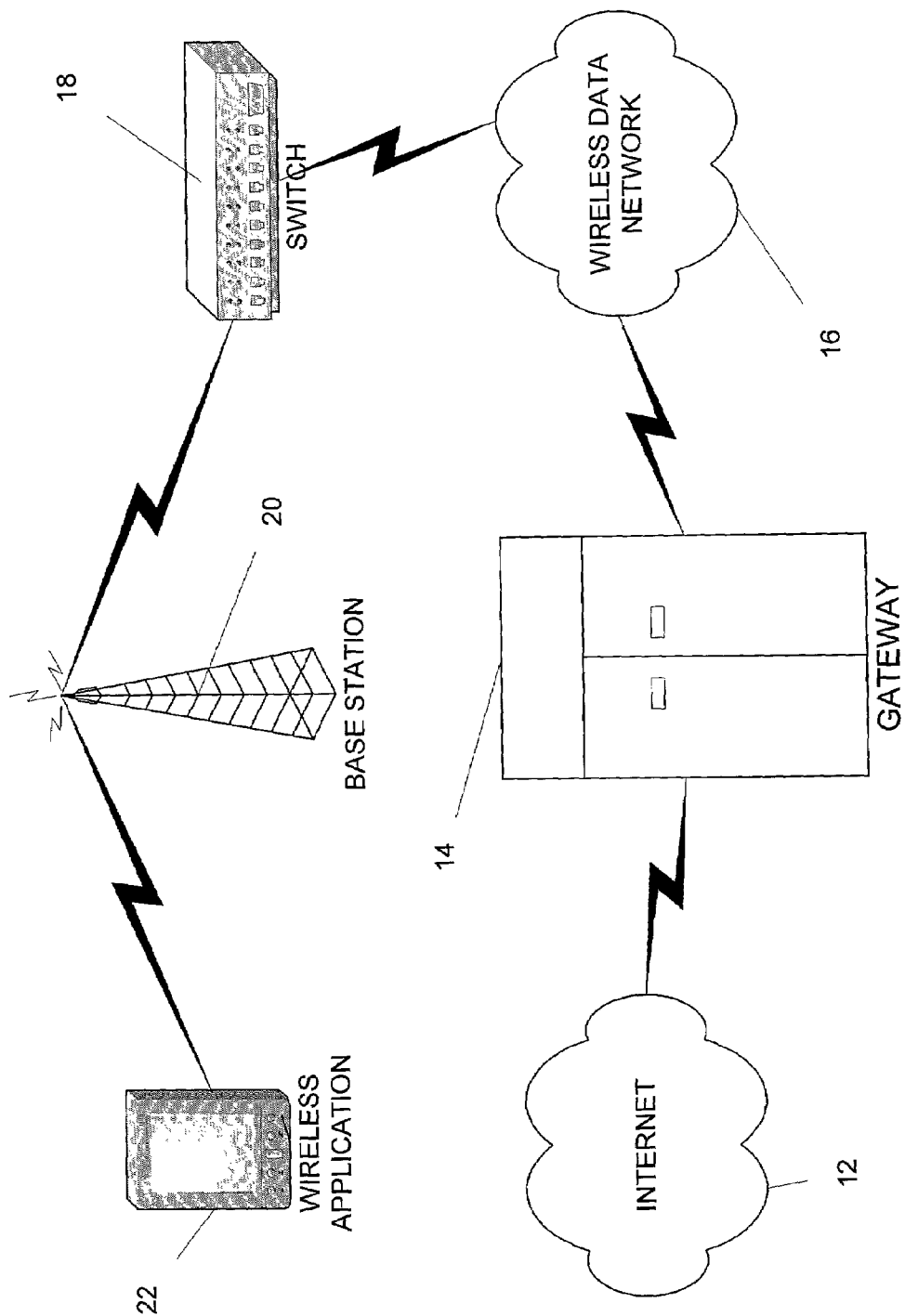
FIG. 2 is a schematic illustrating an overview of an embodiment of a system structured for processing an electronic message in a wireless communication network.

Referring now to FIGS. 1 and 2, an overview is provided for one embodiment of the present methods and systems for processing data received by a recipient in a wireless communication environment. In step 2, an electronic message is transmitted to a gateway 14 from a source such as the Internet 12, for example, or another communications network. The gateway 14 processes the electronic message in step 4 based on certain characteristics of the electronic message. These characteristics can include the size and type of the electronic message, for example, and the kind and size of one or more attachments associated with the electronic message. In step 4, each attachment associated with the electronic message is processed by the gateway 14 provided with a substantially unique indicia tag that is derived from the kind and size characteristics, among other characteristics such as identifying information for the gateway 14, for example.

Subject to application of the indicia tag to the electronic message and the inclusion of any applicable attachments with the electronic message as identified and processed by the gateway 14, the electronic message is either (1) forwarded to the recipient with the attachments in step 6, or (2) transmitted to the recipient in step 8 without the attachments but including the indicia tag applied by the gateway 14.

In either situation provided by step 6 and step 8, the electronic message is forwarded to the recipient through a wireless data network 16. The wireless data network 16 can access one or more switches 18, which in turn communicate with one or more base stations 20. The recipient then receives the electronic message by employing a wireless application 22 in connection with one or more of the base stations 20. In step 10, the recipient can decide the further disposition of any attachments for which only indicia tag information has been transmitted in the electronic message. Examples of subsystems are discussed in more detail hereinbelow that can be accessed by the recipient to perform further processing of the electronic message and any associated attachments.

As can be seen, the gateway 14 not only communicates with wireless applications for peer-to-peer communication, for example, but can also communicate with the Internet 12. Additional functionality of the gateway 14 can include a plurality of methods and systems for accessing conventional traditional wireline communication via wireless applications. Examples of this additional functionality include the following: an interactive voice response (IVR) system that allows two-way communications via a touch-tone phone; an interface that allows wireless application users to send faxes; an interface that enables users to send text-to-speech messages to a telephone; an interface that provides scripts to access Internet-based information from a wireless e-mail application; and an extension to the HP4 (ACK Paging) protocol that allows two-way pager wireless communication with the gateway 14.

The gateway 14 can also provide wireless communications services to interactive messaging clients using a variety of conventional protocols. The gateway 14 can provide peer-to-peer messaging services, which can include message delivery, delivery confirmation, and read confirmation. The gateway 14 can also provide Internet e-mail services, attachment processing, and user-selectable filtering and auto-forward for electronic messages. The gateway 14 is also structured for remote administration. Error logs and automatic reporting are available to alert administrators of system-level problems. Advanced communications support is provided to allow wireless users to send faxes, text-to-speech messages, and one-way pages, and to access the Internet or other networked communications environments.

In addition, an application program interface (API) can be made available in connection with the gateway 14 to allow service providers to add other services and to allow for customized wireless applications. Users can be provided with an accompanying API guide that includes examples of how to use the API functions in a wireless application. If the customer wishes to program a wireless application to a lower communications level, a guide describing the complete Internet interface protocol can also be made available. Users can also correspond with other wireless applications such as other messaging units, without the need for wireless access themselves, via a set of Internet interfaces provided into the gateway 14. These Internet interfaces can utilize, for example, socket technology, both in UDP and TCP protocol varieties, to provide users with methods and systems for interacting with other wireless application users from a central Internet-connected point.

In connection with operation of the gateway 14, UDP and TCP socket API's can utilize a "push" paradigm for transmitting data to an Internet-connected user. Therefore, the user need not poll the gateway 14 looking for incoming data such as electronic messages. Instead, the gateway 14 can automatically transmit data and messages to the socket communication layer of the user. Upon the arrival of incoming data, the communication layer informs the client application via a conventional functionality such as an interrupt message queue, for example, that the user should apply a wireless application to pull data and messages from the socket. This approach allows the user of a wireless application to be free from concern about inbound data until data or messages are transmitted for processing. Functionally speaking, the socket interfaces provide the Internet-connected user with the ability to send messages to a wireless application, receive delivery and read confirmations, and obtain replies to previously transmitted electronic messages. It can be seen that two or more users connected to the wireless data network can communicate data and messages between and/or among each other through the gateway 14. It can be appreciated that electronic transmissions through the gateway 14 are fault-tolerant due to built-in retry logic that is applied to circumnavigate traffic volume issues presented by Internet access.

Figure 3:
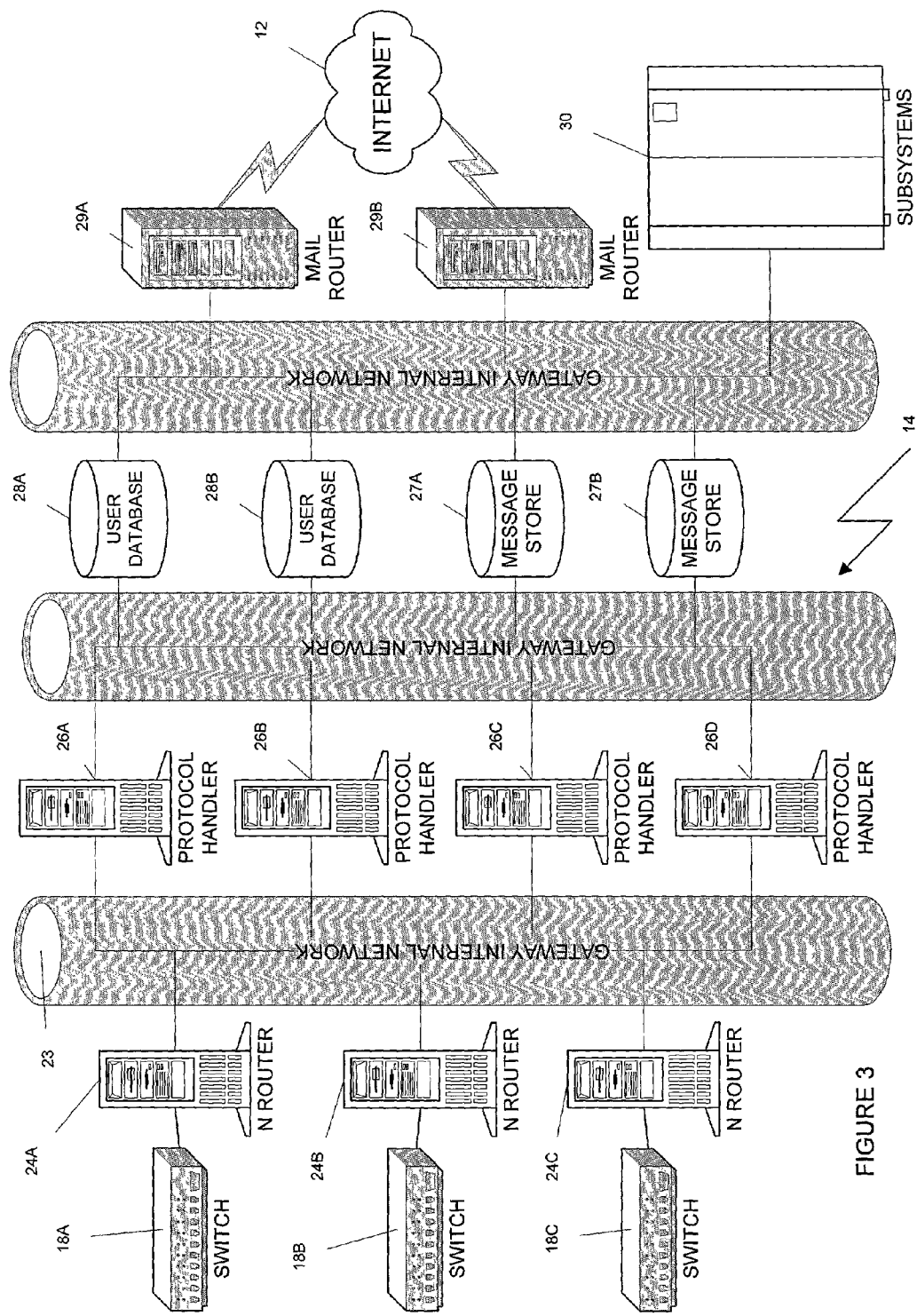
FIG. 3 is a schematic that illustrates more detailed structure of the gateway shown in FIG. 2.

Referring now to FIG. 3, an embodiment of a system for processing wireless communications is provided. The gateway 14 includes an internal network 23 that interconnects one or more N Router machines (24A, 24B, 24C), one or more protocol handlers (26A, 26B, 26C, 26D), one or more message stores (27A, 27B), one or more user databases (28A, 28B), one or more mail routers (29A, 29B), and one or more subsystems 30. As shown, the N Router machines (24A, 24B, 24C) are connected to one or more switches (18A, 18B, 18C) which in turn provide connectivity for the gateway 14 to a wireless data network (not shown). The mail routers (29A, 29B) provide connectivity for the gateway 14 to the Internet 12.

In this embodiment, with respect to the user of a wireless application, the gateway 14 can be considered a mailbox and an interface to the Internet 12. Electronic messages or data can be transmitted from the Internet 12 through one of the mail routers (29A, 29B) to a recipient with a wireless application such as a pager, for example. In one embodiment, the mail routers (29A, 29B) can handle inbound and outbound Internet traffic as well as X-Sockets traffic. In another embodiment, a separate X-Sockets machine, with or without backup, can be added to the gateway 14.

The gateway 14 receives the transmitted data in one of the message stores (27A, 27B) and applies one of the protocol handlers (26A, 26B, 26C, 26D) to identify the wireless protocol necessary to deliver the message to the intended recipient. An unlimited number of protocol handlers (26A, 26B, 26C, 26D) can be used. In different embodiments of the present methods and systems, each protocol handler (26A, 26B, 26C, 26D) can have up to five protocol processes, which can comprise, for example, any combination of HP98, HP99, or HPID-4 processes. In other embodiments, the protocol handlers (26A, 26B, 26C, 26D) communicate with the N Router machines (24A, 24B, 24C) and the user databases (28A, 28B) using X-sockets. In at least one embodiment, message store (27A, 27B) functions and Internet 12 access are handled via NFS.

Through its connection with the wireless data network, the gateway 14 can determine whether or not the intended recipient is active on the wireless data network. Once the wireless application associated with the intended recipient is available, the gateway 14 delivers the message from the message store (27A, 27B, 27C) through the N Router machine (24A, 24B, 24C) to the intended recipient. Likewise, when a user sends data or an electronic message from a wireless application through the wireless data network, the gateway 14 receives the data through one of the N Router machines (24A, 24B, 24C) and either delivers it to another user connected on the wireless data network or transmits the data to the Internet 12.

The user databases (28A, 28B) can be employed in the gateway 14 to perform certain functions. The user databases (28A, 28B) check user access to the gateway 14 to verify whether the user is a valid subscriber and can permit signatures to be associated with data and messages of a given user. Billing records and account reconciliation can be performed by these databases (28A, 28B). The gateway 14 also maintains a profile feature with these databases (28A, 28B) that permits the gateway 14 to receive instructions regarding forwarding and filtering of data and messages received by a wireless user.

Figure 4:
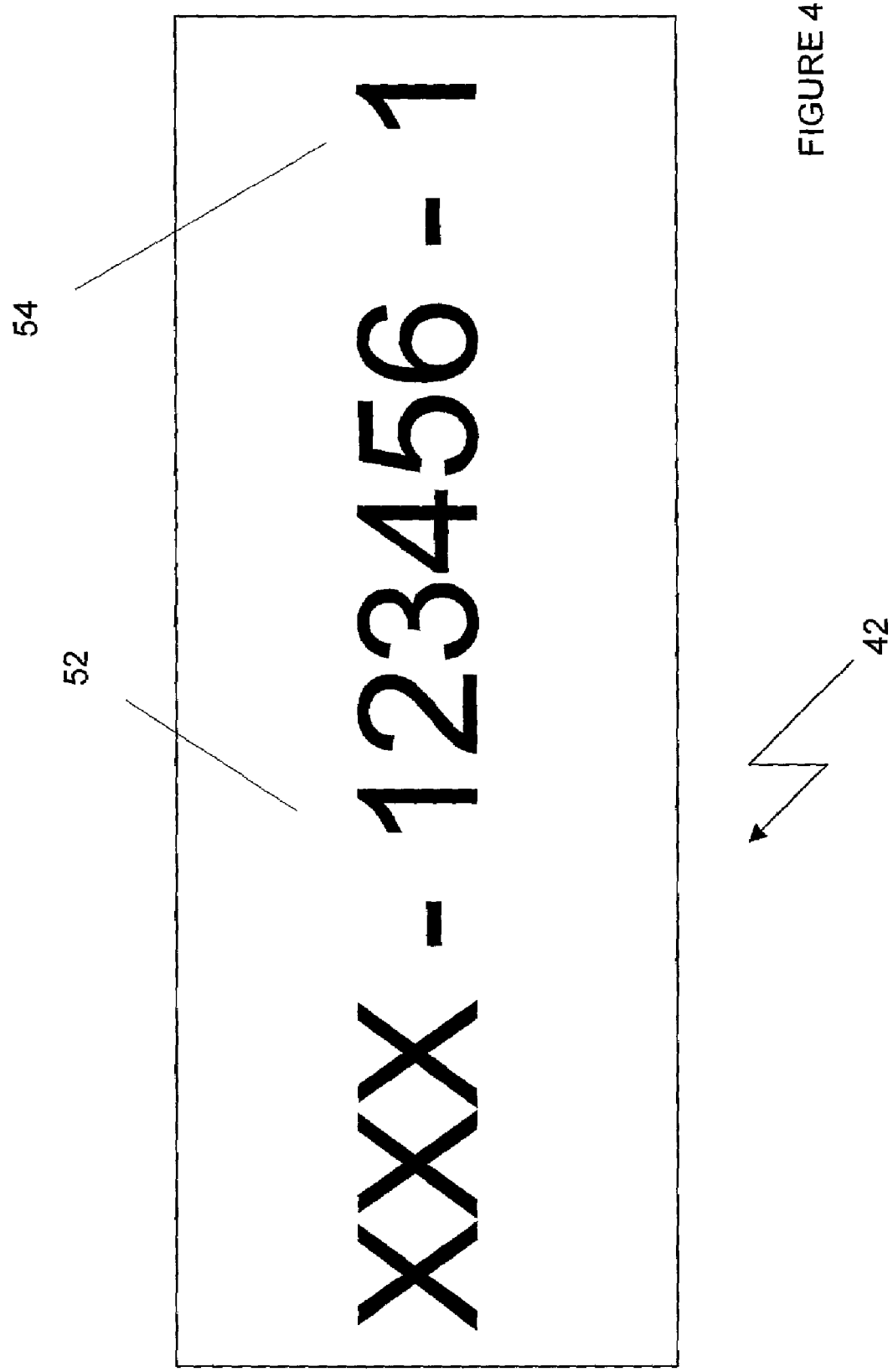
FIG. 4 is a schematic showing an example of an indicia tag for identifying an attachment in a wireless network in accordance with the present methods and systems.
Figure 5:
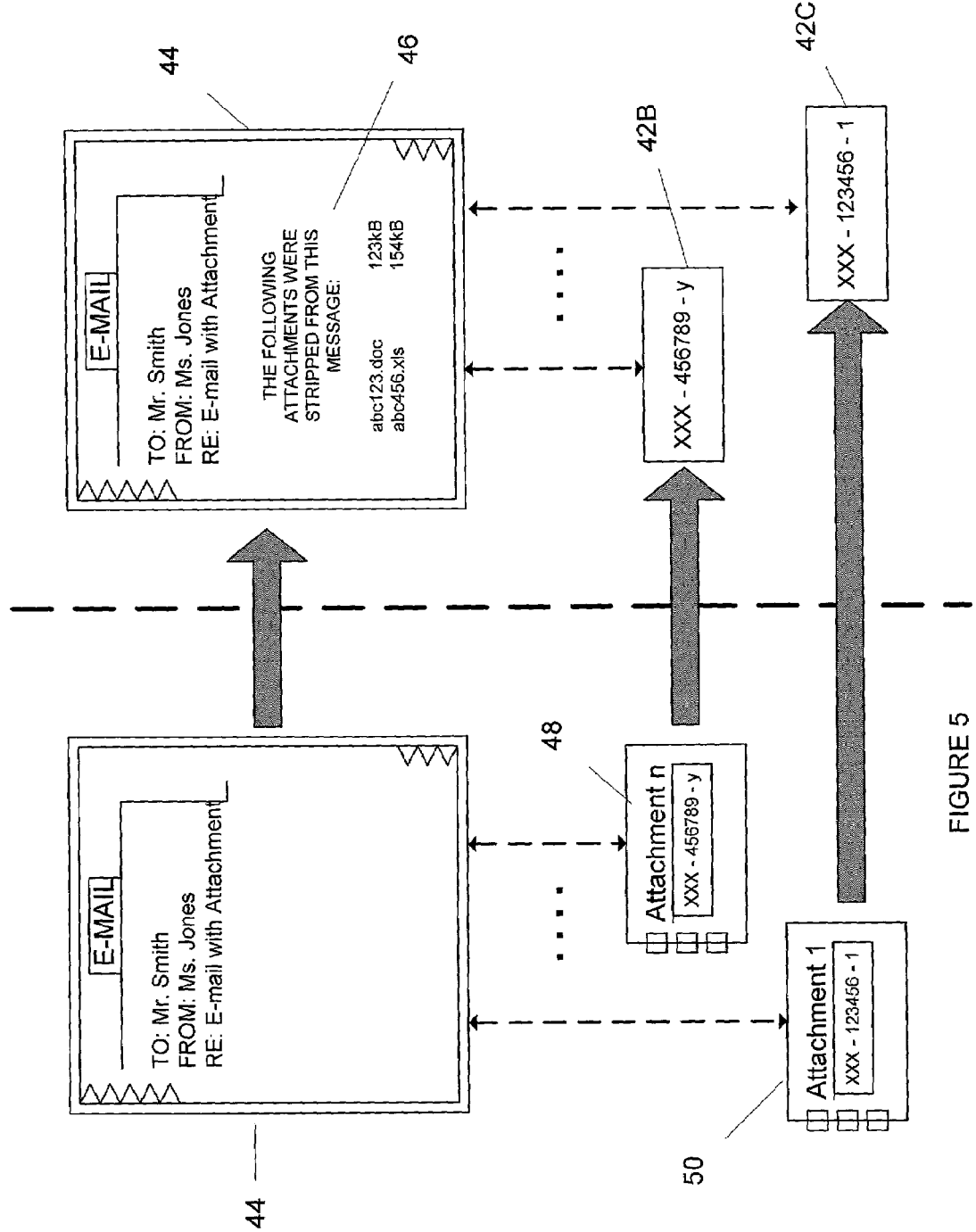
FIG. 5 is a schematic showing an example of removal of an attachment and addition of an indicia tag to an electronic message in accordance with the present methods and systems; and, FIG. 6 is a schematic that illustrates more detailed structure of the subsystems shown in FIG. 2.

Referring now to FIGS. 4 and 5, in its operation to process electronic messages, the gateway adds an indicia tag (42, 42B, 42C) to each message 44 which is indicative of the message and its attachments. The gateway provides an indication 46 in the body of the message 44 of receipt of one or more attachments 48,50 and permits the user/recipient to control further disposition of the message 46 and its associated attachments. For example, an e-mail with an attached word processing document is transmitted to a user with a pager connected to the wireless data network. The recipient receives an indication on the pager with the text of the e-mail and indicia that identify whether or not the word processing attachment was stripped from the e-mail by the gateway. The gateway can have predetermined logic that defines whether or not an attachment should be stripped from a transmitted electronic message. This logic can include criteria such as file size or file type, for example, to determine whether to transmit an attachment to a user on the wireless data network or to retain the message in storage within the gateway.

The gateway applies a unique identifier 52 in each indicia tag 42 for each message 44 processed through the gateway. The unique identifier 52 can be based on any number of factors such as the time and date the message was received by the gateway. A counter 54 can be added to the unique identifier to differentiate between and among messages and data received substantially simultaneously by the gateway. This unique identifier 52 can be coupled with other information associated with the attachments 48,50 of an electronic message 44 such as file size, file type, file name and gateway data, for example.

Figure 6:
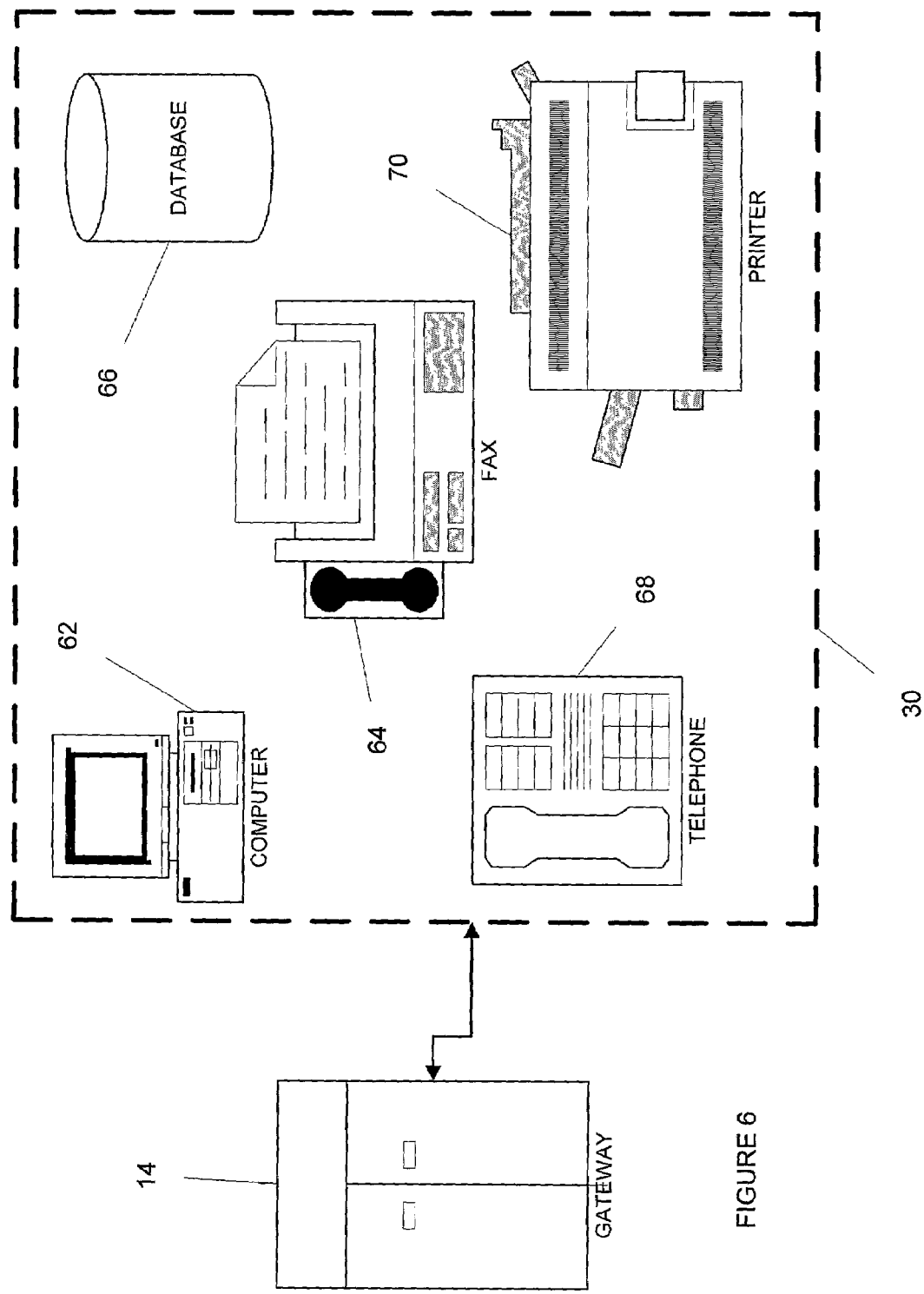

Referring now to FIG. 6, when a user receives a message that one or more portions of an electronic message have been stripped by the gateway 14, the user can determine further processing for the stripped information by accessing the subsystems 30 of the gateway 14. The subsystems 30 can include, for example, the following functions connected or connectable to the gateway 14: a computer 62 for receiving, storing and/or displaying the attachment; a fax machine 64 for faxing and/or printing the attachment; a database 66 associated with an Internet site for storing the attachment (e.g., a commercial e-mail service provider); a phone 68 for speaking the message and/or attachment via text-to-speech through a receiver of the phone 68; and a printer 70 for printing the attachment. In the process of forwarding the message to one of these functions, the gateway 14 accesses the indicia information (discussed above) stored on the message and/or attachment.

One benefit of this arrangement is that the full message and/or attachments need not be transmitted over the wireless bandwidth to the user on the wireless data network. The message and/or attachments are stored in an appropriate location on the gateway 14 awaiting the decision of the user as to their further disposition. Subject to criteria including file size, only the identifying indicia related to the message and/or attachments are transmitted by wireless communication to the user on the wireless data network.

Examples presented herein are intended to illustrate potential implementations of the present wireless communication method and system embodiments. It can be appreciated that such examples are intended primarily for purposes of illustration. No particular aspect or aspects of the method and system embodiments described herein are intended to limit the scope of the present invention. For example, it can be appreciated that a particular choice of nomenclature for indicia tags applied by the present wireless communication methods and systems are only for illustration purposes.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A method for processing data in a wireless communication network comprising:
   receiving at a gateway for the wireless communication network at least one electronic message having at least one attachment associated therewith;
   processing the at least one electronic message based on characteristics of the at least one electronic message including size and type of the at least one electronic message and based on characteristics of the at least one attachment including size and type of the at least one attachment, wherein a determination is made whether to remove a respective attachment from the at least one electronic message;
   in response to a determination being made to remove one or more attachments from an electronic message, providing the electronic message with one or more indicia tags for the one or more attachments being removed from the electronic message, the one or more indicia tags being derived from the characteristics of the one or more attachments including identifying information for the gateway and size and type characteristics;
   forwarding the electronic message to the recipient with the one or more indicia tags and without the one or more attachments;
   displaying the size and type of the one or more attachments that were removed from the electronic message as indicated by the one or more indicia tags in the electronic message;
   receiving instructions from the recipient for processing an attachment that was removed from the electronic message and replaced with an indicia tag at a subsystem connected to the gateway, the subsystem comprising a fax machine for faxing the attachment; a database for storing the attachment; and a text-to-speech device for speaking the contents of the attachment; and
   processing the attachment at a plurality of the subsystems indicated by the user, wherein the gateway is configured to provide wireless communications services to interactive messaging clients and provide Internet e-mail services and user-selectable filtering and wherein the gateway is configured to provide a delivery confirmation for the message to a sender of the electronic message after the message has been delivered to the recipient over the wireless communication network.

2. The method of claim 1, wherein the gateway selectively denies transmission of attachments of electronic messages based unilaterally on message characteristics.

3. The method of claim 1, wherein the electronic message is forwarded in a push operation.

4. The method of claim 1, further comprising:
   storing the one or more attachments after removing the one or more attachments.

5. The method of claim 1, wherein the at least one electronic message is received through a connection to the Internet.

6. The method of claim 1, wherein the at least one electronic message is received from a wireless data network.

7. The method of claim 1, wherein the electronic message is forwarded through a wireless data network.

8. The method of claim 1, wherein the electronic message is forwarded through a wireless data network to a wireless application.

9. The method of claim 8, wherein said wireless application is selected from the group consisting of a pager, a personal digital assistant, a wireless telephone, a wireless computer, a digital camera, and a digital camera including a self-contained web-cam.

10. A memory device containing instructions for controlling a computer system to perform a method in a wireless communication environment, said instructions, when executed by the computer system, cause the computer system to perform:
    receiving at a gateway for a wireless communication network at least one electronic message having at least one attachment associated therewith;
    processing the at least one electronic message based on characteristics of the at least one electronic message including size and type of the at least one electronic message and based on characteristics of the at least one attachment including size and type of the at least one attachment, wherein a determination is made whether to remove a respective attachment from the at least one electronic message;
    in response to a determination being made to remove one or more attachments from an electronic message, providing the electronic message with one or more indicia tags for the one or more attachments being removed from the electronic message, the one or more indicia tags being derived from the characteristics of the one or more attachments including identifying information for the gateway and size and type characteristics;
    forwarding the electronic message to the recipient with the one or more indicia tags and without the one or more attachments;
    displaying the size and type of the one or more attachments that were removed from the electronic message as indicated by the one or more indicia tags in the electronic message;
    receiving instructions from the recipient for processing an attachment that was removed from the electronic message and replaced with an indicia tag at a subsystem connected to the gateway, the subsystem comprising a fax machine for faxing the attachment; a database for storing the attachment; and a text-to-speech device for speaking the contents of the attachment; and
    processing the attachment at a plurality of the subsystems indicated by the user, wherein the gateway is configured to provide wireless communications services to interactive messaging clients and provide Internet e-mail services and user-selectable filtering and wherein the gateway is configured to provide a delivery confirmation for the message to a sender of the electronic message after the message has been delivered to the recipient over the wireless communication network.

11. A system for processing data in a wireless communication network comprising:

a gateway for the wireless communication network configured to:
- receive at least one electronic message having at least one attachment associated therewith;
- process the at least one electronic message based on characteristics of the at least one electronic message including size and type of the at least one electronic message and based on characteristics of the at least one attachment including size and type of the at least one attachment, wherein a determination is made whether to remove a respective attachment from the at least one electronic message;
- in response to a determination being made to remove one or more attachments from an electronic message, provide the electronic message with one or more indicia tags for the one or more attachments being removed from the electronic message, the one or more indicia tags being derived from the characteristics of the one or more attachments including identifying information for the gateway and size and type characteristics;
- forward the electronic message to the recipient with the one or more indicia tags and without the one or more attachments;
- display the size and type of the one or more attachments that were removed from the electronic message as indicated by the one or more indicia tags in the electronic message;
- receive instructions from the recipient for processing an attachment that was removed from the electronic message and replaced with an indicia tag at a subsystem connected to the gateway, the subsystem comprising a fax machine for faxing the attachment; a database for storing the attachment; and a text-to-speech device for speaking the contents of the attachment; and
- process the attachment at a plurality of the subsystems indicated by the user, wherein the gateway is configured to provide wireless communications services to interactive messaging clients and provide Internet e-mail services and user-selectable filtering and wherein the gateway is configured to provide a delivery confirmation for the message to a sender of the electronic message after the message has been delivered to the recipient over the wireless communication network.

12. The system of claim 11, further comprising at least one mail router for receiving the electronic messages from the Internet.

13. The system of claim 12, wherein at least one of said mail routers is structured to handle traffic selected from the group consisting of inbound Internet traffic, outbound Internet traffic, and X-Sockets traffic.

14. The system of claim 11, further comprising at least one message store for storing the electronic messages.

15. The system of claim 11, further comprising at least one user database containing information for at least one user of the gateway.

16. The system of claim 15, wherein at least one of the user databases is structured to verify user access to the gateway.

17. The system of claim 15, wherein at least one of the user databases is structured to permit signatures to be associated with the messages.

18. The system of claim 15, wherein at least one of the user databases is structured to receive instructions for filtering the electronic messages.

19. The system of claim 18, further comprising at least one protocol handler for processing the electronic messages.

20. The system of claim 19, wherein the gateway determines whether the recipient is active on the wireless communication network before delivering the electronic message to the recipient.

21. The system of claim 11, further comprising at least one N Router machine for receiving the electronic messages in the gateway when the source is a wireless data network and transmitting the electronic messages to a recipient when the source is the Internet.

* * * * *